United States Patent [19]
Yokoshima

[11] Patent Number: 5,225,121
[45] Date of Patent: Jul. 6, 1993

[54] METHOD FOR REPAIRING A PIPE

[76] Inventor: Yasuhiro Yokoshima, 175-3 Ooaza-shinoyama, Ishige-cho, Yuuki-gun, Ibaraki-ken, Japan

[21] Appl. No.: 776,046

[22] Filed: Oct. 16, 1991

[30] Foreign Application Priority Data

May 14, 1991 [JP] Japan .................................. 3-137100

[51] Int. Cl.$^5$ ............................................ B29C 63/20
[52] U.S. Cl. ........................................ 264/36; 138/97; 156/94; 156/287; 156/294; 264/269; 264/573
[58] Field of Search ............... 156/94, 156, 287, 294, 156/267; 264/36, 269, 516, 573; 138/97; 134/22.12; 239/566; 427/238

[56] References Cited

U.S. PATENT DOCUMENTS

| 4,009,063 | 2/1977 | Wood ................. | 156/294 |
| 4,064,211 | 12/1977 | Wood ................. | 156/287 |
| 4,602,974 | 7/1986 | Wood et al. ......... | 156/294 |
| 4,865,673 | 9/1989 | Shishkin et al. .... | 156/294 |
| 5,009,715 | 4/1991 | Wilson ............... | 134/22.12 |

FOREIGN PATENT DOCUMENTS

| 88281 | 5/1983 | Japan ................ | 156/294 |
| 60-242038 | 12/1985 | Japan . | |

*Primary Examiner*—Michael W. Ball
*Assistant Examiner*—Steven D. Maki
*Attorney, Agent, or Firm*—Lowe, Price, LeBlanc & Becker

[57] ABSTRACT

A method for repairing a pipe comprising the steps of:
(a) coating a resin-absorbable tubular liner, at least one side thereof which becomes the inner side eventually, with a hermetic film;
(b) inserting the resin-absorbable tubular liner into the pipe to be repaired;
(c) impregnating the thermosetting resin into the resin-absorbable tubular liner;
(d) closing one end of the tubular liner and passing a sprinkler means in the tubular liner to extend from the closed end to the open end of the tubular liner;
(e) sending pressurized air into the tubular liner from the open end thereof to thereby inflate the tubular liner to fit closely in the pipe;
(f) sending in the sprinkler means a hot liquid of a temperature sufficiently high to cause the thermosetting resin impregnated in the tubular liner to harden, to thereby sprinkle the hot liquid onto the tubular liner to thereby harden the thermosetting resin impregnated therein; and
(g) cutting off the ends of the tubular liner.

7 Claims, 2 Drawing Sheets

METHOD FOR REPAIRING A PIPE

FIELD OF THE INVENTION

The present invention relates to a method for repairing a defective or old pipe by internally lining it.

DESCRIPTION OF THE PRIOR ART

When an underground utility pipe or an underground industrial pipe, such as sewer pipe, gas pipe, and electric conduit pipe, is defective or too old, the pipe is repaired and reinforced without digging and disassembling the sections of the pipe. This method of repairing a pipe is known and practiced in the field of civil engineering. Typically, the method is disclosed by Japanese Provisional Patent Publication (Kokai) No. 60-242038.

According to the publication, this method of pipe repair comprises inserting a sufficiently long tubular flexible liner bag into the pipe to be repaired by means of a pressurized fluid, like air and water. The tubular liner bag is made of a flexible resin-absorbable material impregnated with a thermosetting resin, and has the outer surface coated with a hermetic film. More particularly, according to the publication, the tubular flexible liner bag is closed at one end and open at the other. The tubular flexible liner bag is first flattened. The closed end of the tubular liner bag is tied to a control rope. The open end of the tubular liner bag is made to gape wide and hooked at the end of the defective or old pipe in a manner such that the wide-opened end of the liner completely and fixedly covers and closes the pipe end. A portion of the liner is pushed into the pipe. Then, the pressurized fluid is applied to the said portion of the tubular liner such that the fluid urges the tubular liner to enter the defective pipe. Since one end of the tubular liner is hooked at the end of the pipe, it remains there while the rest of the flexible liner bag is turned inside out as it proceeds in the pipe. (Hereinafter, this manner of insertion shall be called "reversing".) When the entire length of the tubular liner bag is reversed (or turned inside out) into the pipe, the control rope holds the closed end of the tubular liner bag to thereby control the length of the tubular liner in the pipe. Then, the reversed tubular liner is pressed against the inner wall of the defective pipe by the said pressurized fluid, and the tubular flexible liner is hardened as the thermosetting resin impregnated in the liner is heated which is effected by heating the fluid filling the tubular liner bag by means of a hot steam, etc. It is thus possible to line the inside wall of the defective or old pipe with a rigid liner without digging the ground and disassembling the pipe sections.

However, in this conventional method, when the fluid used is a liquid such as water, it is necessary to heat the entire body of the liquid contained in the reversed tubular liner bag, and this consumes a considerable amount of fuel or electricity as well as time, especially when the diameter or the length of the pipe to be repaired is large. Also, since this conventional method uses a large volume of the liquid, it requires a large-sized boiler, hot water pump, heating and circulation installation, etc. Thus, the preparation as well as the operation for the pipe repair takes many hours and large cost. Consequently, with this conventional heating method, the operation efficiency is poor and the operation cost is high.

Also, when the pipe to be repaired is slanted steeply or even vertical, the hydraulic pressure difference becomes great between the upper part and the lower part of the pipe so that the tubular liner bag is liable to burst at its lower part. Similarly, since the hydraulic pressure exerted upon the tubular liner bag differs between the upper part and the lower part of the pipe, the thickness of the tubular liner bag at the upper part becomes much greater than that at the lower part.

When the fluid used is a gas such as compressed air, a problem also exists. Often the thermosetting resin impregnated in the tubular liner bag is an unsaturated polyester resin or a highly reactive epoxy resin, and once heated to certain temperatures they start undergoing exothermic reactions as they consolidate. Thus, especially when the thickness of the tubular pipe is relatively great, the temperature of the pipe goes up extremely high, and the heat thus generated heats up the steam or the hot air being introduced, and the steam or the hot air in turn scorches the already hardened tubular liner bag. As a result, the hardened tubular liner bag expands in all directions and increases the residual stress in the liner until it cracks at various locations.

Furthermore, if the thermosetting resin used is a highly reactive, unsaturated polyester resin and the thickness of the tubular liner is 9 mm or greater, the temperature of the thermosetting resin rises 140° C. or even greater as the resin undergoes the exothermic reaction and hardens, and this results in boiling and evaporation of the styrene contained in the tubular liner, and the thus generated styrene gas forms bubbles in the tubular liner, which weakens the strength of the tubular liner.

Incidentally, in the conventional method wherein the tubular liner bag is filled with a liquid such as water and heated thereby, forced stirring of the liquid is necessary since the convection of the liquid is too slow to achieve prompt and uniform heating of the liner.

This invention was contrived in view of the above problems, and, therefore, it is an object of the invention to provide an improved method for repairing a defective or old pipe, which enables a prompt heating of the thermosetting resin impregnated in the tubular flexible liner with a small consumption of heat energy, even if the diameter or the length of the pipe to be repaired is large; which requires only a small-sized, compact boiler, hot water pump, heating and circulation installation, etc. in place of the conventional large-sized ones; and which, furthermore, enables a steeply slanted pipe to be uniformly lined, that is, lined with a rigid liner of uniform thickness, having no cracks or voids.

SUMMARY OF THE INVENTION

In order to attain the above-described objects and others, the inventor contrived a method for repairing a defective or old pipe by internally lining the pipe with a tubular lining material, comprising the steps of:

(a) coating a resin-absorbable tubular liner, at least one side thereof which becomes the inner side eventually, with a hermetic film;

(b) inserting the resin-absorbable tubular liner into the pipe to be repaired;

(c) impregnating the thermosetting resin into the resin-absorbable tubular liner;

(d) closing one end of the tubular liner and passing a sprinkler means in the tubular liner to extend from the closed end to the open end of the tubular liner;

(e) sending pressurized air into the tubular liner from the open end thereof to thereby inflate the tubular liner to fit closely in the pipe;

(f) sending in the sprinkler means a hot liquid of a temperature sufficiently high to cause the thermosetting resin impregnated in the tubular liner to harden, to thereby sprinkle the hot liquid onto the tubular liner to thereby harden the thermosetting resin impregnated therein; and (g) cutting off the ends of the tubular liner; wherein the order of the steps (a) through (d) being not fixed.

According to the invention, the tubular liner bag pressed against the inner wall of the defective or old pipe is uniformly heated by the hot liquid sprinkled on it by the sprinkler means whereby the thermosetting resin impregnated in the tubular liner bag is caused to uniformly harden, so that the heat energy required is only that to heat up the liquid for sprinkling and not the bulky volume of the liquid that would fill the tubular liner bag in the case of the conventional method, and since the volume of the liquid used is much smaller, small-sized, compact boiler, hot water pump, heating and circulation installation, etc. will suffice to repair the pipes having large diameters and lengths in relatively short time.

Also, according to the invention, the tubular liner bag is pressed against the inner wall of the pipe by means of the air pressure, the pressure is virtually uniform throughout the tubular liner bag whether the pipe is vertical or horizontal, unlike the case where water is used to inflate the tubular liner bag, so that the tubular liner bag does not burst and the thickness of the hardened liner will be uniform.

Furthermore, according to the invention, a liquid is used as the heating medium so that the excessive heat generated by the exothermic reaction of the thermosetting resin is absorbed by the liquid, which is further heated and evaporates and the temperature is kept at or below the boiling point of the liquid (about 100° C. in the case of water). Consequently, the temperature of the tubular liner does not rise far beyond 100° C., and thus the liner does not crack or contain voids.

Finally, according to the invention, since the entire body of the tubular liner bag is heated uniformly with the sprinkled hot liquid, with the steam that is generated as the sprinkled liquid is heated and boiled by the exothermic thermosetting resin, and with the hot liquid flowing over the bottom of the tubular liner bag, there is no need of stirring the liquid.

The above and other objects and features of the invention will appear more fully hereinafter in the following description given in connection with the accompanying drawings and the novelty thereof pointed out in the appended claims.

DETAILED DESCRIPTION OF THE INVENTION

Now, a method of repairing a defective pipe, according to the invention, will be explained with reference to the attached drawings.

Figure 1:
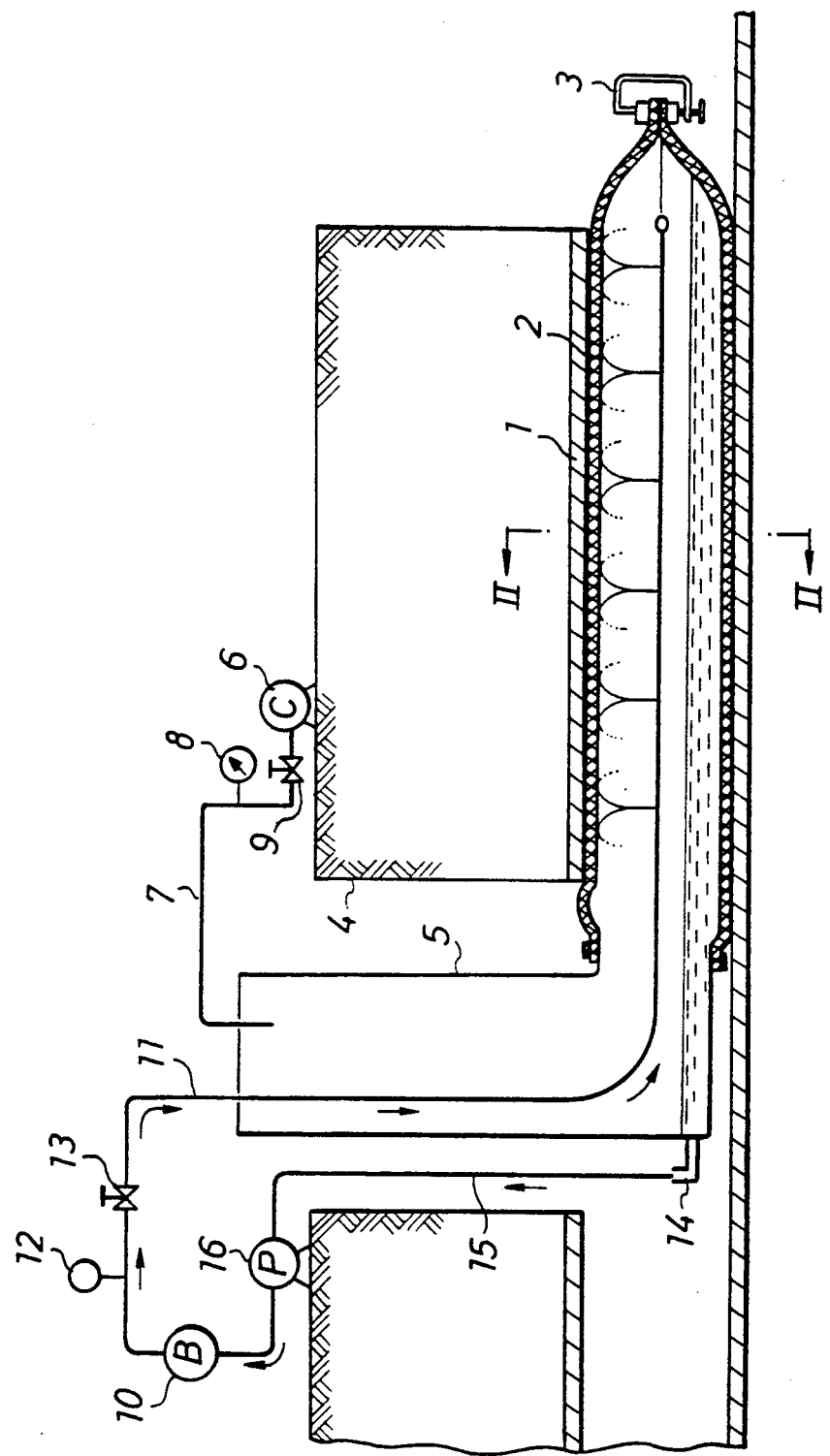
FIG. 1 is a vertical sectional view of a site of the pipe repair in which the method of the invention is practiced.

In FIG. 1 which schematically shows a site of the pipe repair operation, reference numeral 1 designates an underground sewer pipe. A flexible tubular pipe liner bag 2 is inserted in the pipe 1. But, this pipe liner bag 2 itself must be described in detail first. A rectangular nonwoven resin-absorbable fabric of polyester felt is sewed into a tubular shape. The tubular pipe line 2 is then impregnated with a thermosetting resin and is coated with an air- and water-tight film which hermetically covers at least the inner wall of the pipe liner 2. (This hermetic film may be made of urethane, polyester, elastomer, or an organic silicon resin.) Incidentally, in this example, the pipe liner 2 is impregnated with the thermosetting resin before it is coated with the film and inserted in the pipe 1, it is also possible to impregnate the pipe liner 2 with the thermosetting resin after the pipe liner 2 is coated with the film and inserted in the pipe 1.

Also, the devices involved in the method of the invention will be explained with reference to FIG. 1.

As shown in FIG. 1, the tubular pipe liner bag 2 inserted in the pipe 1 has its one end closed by means of a stopper 3; the other end of the pipe liner 2 is gaped wide and mouthing in it the open end of a pressure vessel 5 installed in a manhole 4 such that there occurs no leakage at the joint.

An air compressor 6 is connected to the pressure vessel 5 by means of a conduit pipe 7, which is provided with a pressure indicator 8 and a pressure regulating valve 9. A hot water hose 11 is passed throughout the tubular liner 2. One end of a hot water hose 11 is connected to a hot water boiler 10 installed on the ground, and the other end of the hot water hose 11 is connected at the closed end of the pipe liner 2, that is, at the right end of the pipe liner 2, as seen in FIG. 1, so that the hot water hose 11 extends through the pressure vessel 5 and the entire body of the pipe liner 2. That part of the hot water hose 11 which is disposed in the pipe liner 2, is made with a plurality of holes (not exactly shown), at appropriate intervals. These holes enable the pressurized hot water in the hose 11 to shoot out into the pipe liner 2. The hot water hose 11 is provided with a thermometer 12 and a valve 13.

At the bottom of the pressure vessel 5 is provided a water outlet 14, to which is connected one end of a hot water hose 15. The other end of the hot water hose 15 is connected to a hot water pump 16, which is connected to the hot water boiler 10 by way of another length of a hot water hose.

Now, the method of the invention will be explained. When the insertion of the pipe liner 2 is completed, the air compressor 6 is driven and the compressed air supplied therefrom is sent into the pressure vessel 5 by way of the conduit pipe 7, whereby the internal pressure of the pressure vessel 5 is increased and the pipe liner bag 2 is inflated and pressed against the inner wall of the defective pipe 1, as shown in FIG. 1. On this occasion, the internal pressure of the pipe liner bag 2 is measured by means of the pressure indicator 8, and when the pressure exceeds a predetermined value, the pressure regulating valve 9 is operated to relieve some air so as to decrease the internal pressure of the pipe liner bag 2. Thus, the internal pressure of the pipe liner 2 is maintained at a predetermined high value.

Figure 2:
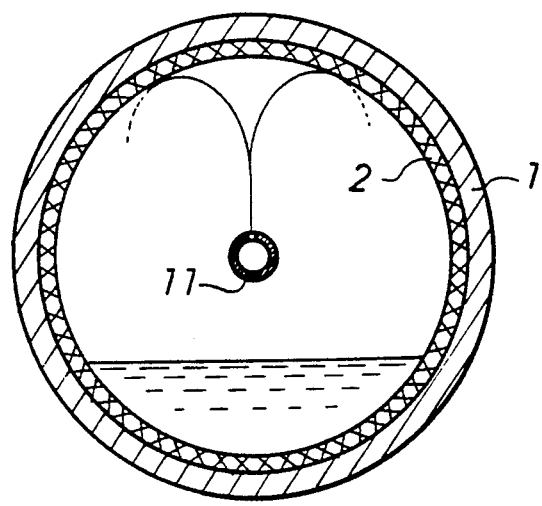
FIG. 2 is an enlarged vertical sectional view taken on the plane indicated by A—A in FIG. 1.

Then, the hot water boiler 10 and the hot water pump 16 are driven whereby the hot water heated by the boiler 10 to a predetermined high temperature is sent into the hot water hose 11 and urged in the direction indicated by arrows. Eventually the hot water shoots out from the holes made in the hot water hose 11. The inner wall of the pipe liner 2 is thus showered with the hot water, and the thermosetting resin impregnated in the pipe liner 2 is heated and prompted to undergo an exothermic reaction with the result that the pipe liner 2 becomes very hot and hardens, whereby the inner wall of the pipe 1 is lined with a hardened pipe liner 2, as shown in FIG. 2. Although the pipe liner 2 becomes very hot, the temperature does not overly exceed the boiling point of the water, since the water applied to the inner wall of the pipe liner 2 absorbs the heat from the pipe liner 2 as the water is heated and eventually evaporates. Thus, the hot water sprinkled over the pipe liner 2 at first functions as the starter for the exothermic reaction of the thermosetting resin, and then functions as the temperature stabilizer.

Incidentally, the hot water that has heated or cooled the pipe liner 2 falls to the bottom of the piper liner 2 and flows into the pressure vessel 5, as shown in FIGS. 1 and 2. This water is then pulled out of the pressure vessel 5 and sucked up by the hot water pump 16 by way of the outlet 14 and the hot water hose 15. Then, the cooled water is sent to the hot water boiler 10 where it is heated to the predetermined temperature again. This hot water is again sent into the pipe liner 2 to contribute to proper hardening of the thermosetting resin impregnated in the pipe liner 2. Thus, the hot water is recirculated within the closed system mainly consisting of the hot water hoses, the pipe liner 2, and the pressure vessel 5.

The ends of the pipe liner bag 2 are cut off after removing all the devices from the pipe liner 2, so that the both ends will look more or less like the cross-section shown in FIG. 2.

Thus, by adopting the liner hardening procedure of the invention, it is possible to conduct a highly effective and economical operation of underground pipe repair. Since, according to the method of the invention, the thermosetting resin hardens promptly and uniformly, heat gradient scarcely occurs in the pipe liner 1 so that after hardening no crack develops in it.

Furthermore, with the operation of this embodiment of the invention, since there is no need of using a large amount of heat medium to heat the thermosetting resin, the heating facility can be simplified and reduced in installation area. Also, the economy is greatly improved, for the energy consumption is much reduced, and the required man power is smaller.

Also, in this embodiment of the invention, the other objects of the invention are all attained, which is obvious from the reasons already stated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for repairing a pipe wherein the pipe is internally lined with a tubular lining material consisting of a resin absorbent tubular liner and a thermosetting resin impregnated therein, comprising the steps of:
   (a) coating a resin absorbent tubular liner, at least one side thereof which becomes the inner side eventually, with a hermetic film;
   (b) inserting the resin-absorbent tubular liner into the pipe to be repaired;
   (c) impregnating said thermosetting resin into the resin-absorbent tubular liner;
   (d) closing one end of the tubular liner and passing a sprinkler means in the tubular liner to continuously extend from the closed end to the open end of the tubular liner;
   (e) sending pressurized air into the tubular liner from the open end thereof to thereby inflate the tubular liner to fit closely in the pipe;
   (f) sending in said sprinkler means a hot liquid of a temperature sufficiently high to cause the thermosetting resin impregnated in the tubular liner to harden and sprinkling the hot liquid simultaneously onto substantially the entire length of the tubular liner to thereby harden the thermosetting resin impregnated therein; and
   (g) cutting off the ends of the tubular liner.

2. The method as claimed in claim 1 wherein the step (b) is earlier than the step (c).

3. The method as claimed in claim 1 wherein the step (c) is earlier than the step (b).

4. The method as claimed in claim 1 wherein the liquid is water.

5. The method as claimed in claim 1 wherein the liquid sent in said sprinkler means is recovered and sent in said sprinkler means repeatedly.

6. A method for repairing a pipe wherein the pipe is internally lined with a tubular lining material consisting of a resin absorbent tubular liner and a thermosetting resin impregnated therein, comprising the steps of:
   (a) coating the resin absorbent tubular liner with a hermetic film;
   (b) inserting the resin-absorbent tubular liner into the pipe;
   (c) impregnating said thermosetting resin into the resin-absorbent tubular liner;
   (d) closing one end of the tubular liner;
   (e) fixing in a stationary position a sprinkler means in the tubular liner;
   (f) supplying pressurized air into the tubular liner from the open end thereof to inflate the tubular liner into contact with inner walls of the pipe;
   (g) supplying said sprinkler means with a hot liquid and sprinkling said hot liquid simultaneously onto substantially the entire length of the tubular liner to thereby harden the thermosetting resin impregnated therein, wherein a temperature of said liquid is sufficiently high to cause the thermosetting resin impregnated in the tubular liner to harden; and
   (h) removing the ends of the tubular liner.

7. The method of claim 6 further comprising the steps of recovering said liquid sprayed by said sprinkler means, reheating said liquid, and resupplying said reheated liquid to said sprinkler means.

* * * * *